United States Patent [19]

Hillemacher

[11] 4,384,636

[45] May 24, 1983

[54] EQUIPMENT FOR PULLING PIPES TOGETHER

[75] Inventor: Helmut Hillemacher, Heinsberg, Fed. Rep. of Germany

[73] Assignee: Josef Krings, Heinsberg, Fed. Rep. of Germany

[21] Appl. No.: 233,779

[22] Filed: Feb. 12, 1981

[30] Foreign Application Priority Data

Feb. 12, 1980 [DE] Fed. Rep. of Germany ....... 3005135

[51] Int. Cl.³ .......................... B60T 1/14; F16L 1/00
[52] U.S. Cl. .......................................... 188/7; 405/154
[58] Field of Search ........................................ 188/5–7; 405/10, 134, 135, 146, 154, 170

[56] References Cited

U.S. PATENT DOCUMENTS 2,020,386 11/1935 Ulrich ..................................... 188/7
2,781,927 2/1957 Holopainen ......................... 188/7 X
4,209,269 6/1980 Martinez .............................. 405/154

Primary Examiner—Duane A. Reger
Attorney, Agent, or Firm—Charles E. Brown

[57] ABSTRACT

This relates to a device for pulling together sewer pipes and other large diameter pipes. The device includes a mobile pulling unit which is preferably mounted on wheels and may be driven through the large diameter pipes. The mobile pulling unit has a pulling cable which extends from a lower portion thereof. A support system is pivotally mounted on the pulling unit and is preferably in the form of an elongated lever including a lower lever arm and an upper lever arm with the two lever arms being disposed in angular relation with respect to each other and carrying shoes for engaging lower and upper surfaces of a pipe in which the pulling unit is mounted. A pressure applying device extends between the pulling unit and the upper lever arm so as to tilt the support means and effect the anchorage thereof in the pipe.

5 Claims, 3 Drawing Figures

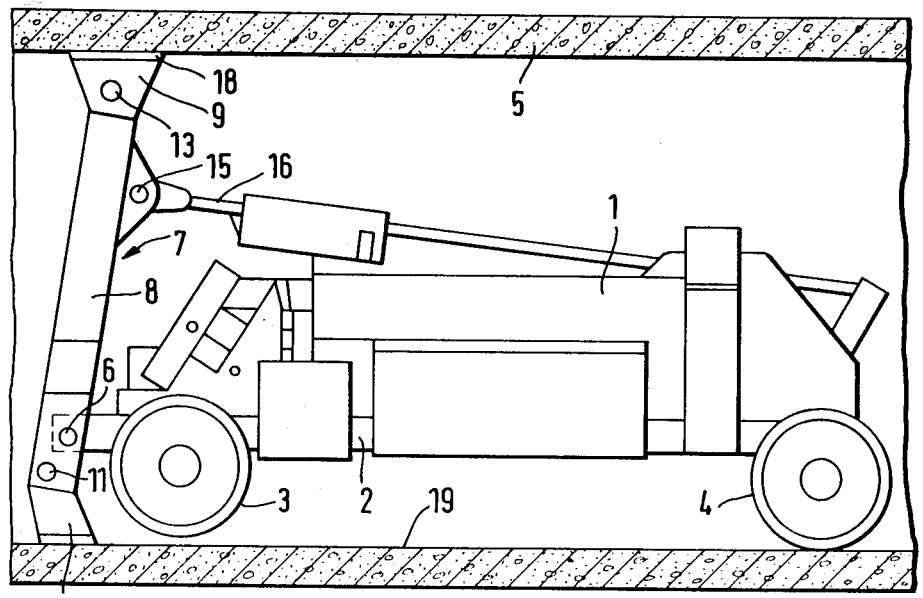
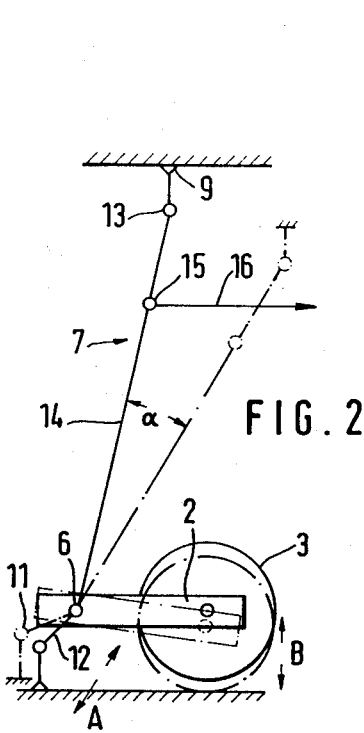
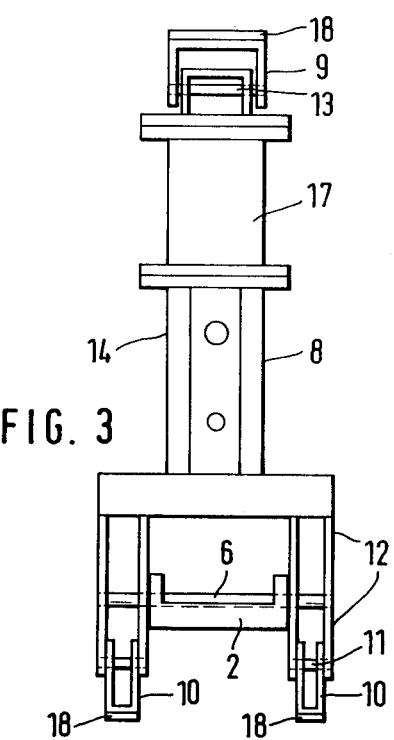

EQUIPMENT FOR PULLING PIPES TOGETHER

The invention relates to equipment for pulling together sewer pipes of large diameters, the equipment including a mobile pulling unit and a support system connected to the pulling unit with the support system engaging the interior of the sewer pipe to anchor the mobile pulling unit.

Known equipment of this type requires securing the pulling unit against axial displacement by providing a support system engaging the gaps of a pipe butt or resting on the very ends of the pipe butt. Accordingly tensional forces are generated when pulling the nearest pipe butt closer and these tensional forces must be absorbed by the relatively small areas provided by pipe butts which are subjected to the actions of wedges or the like of the support system. This frequently causes damages to the butt ends of the pipes (sockets), which are already susceptible to damage due to the required sealing means and thinning of the material of the pipe.

Furthermore it is frequently impossible to anchor the pulling unit in the above identified manner on branch pipes, whereby equipment even more complex is required.

It is the object of the invention to provide equipment of a type such that it can be set up at an arbitrary location within a previously laid sewer pipe and can be so supported that no damage to the pipe may be feared.

This object of the invention is solved by providing a support system which includes a double-arm lever which is pivotably carried by the pulling unit approximately at the height of the pulling cable with the lower lever arm being of a length materially shorter than the length of the upper lever arm and tilting backward with respect to the piece of pipe to be pulled so that a hoof-shaped support shoe mounted for articulation to the end of each lever arm may wedgingly engage the interior of the pipe by way of thrust means carried by the pulling unit and connected to the upper lever arm.

This arrangement offers the advantage that the moment the support system has assumed its intended slanted position of support, the tensional load of the pulling unit contributes to force even more the support shoes against the walls of the sewer pipe and hence to secure the anchoring of the equipment. The articulated connection between the support system and the pulling unit ensures that the pulling unit will not be lifted from the pipe at the front thereof even under the pulling load.

The invention is described in further detail below in an illustrative embodiment and in relation to the drawing.

FIG. 1 is a longitudinal sectional view taken through a pipe and shows the equipment of the invention, FIG. 2 is a schematic view showing the details of the transmission of forces by the support system, and FIG. 3 is a rear view of the support system.

The equipment shown in FIG. 1 essentially comprises a pulling unit 1 which a vehicle frame 2 mounted on four wheels, front wheels 4 and rear wheels 3. A pull cable (omitted) is guided through the pulling unit 1 at about the height of the frame 2 and acts on a pipe butt to be advanced from the right of the equipment to pull it against the butt of the pipe 5 in which is located the equipment of the invention.

A support system 7 is pivotally mounted on a pivot bolt 6 at the rear end of the vehicle frame 2 beyond the rear wheels 3. This support system includes a double-arm lever 8 which has a lower lever arm 12 of a bifucated or divided construction (FIG. 3) carrying hoof-shaped support shoes 10 which are pivotally mounted on the lower lever arm 12. An upper lever arm 14 also carries a support shoe 9 which is pivotally mounted on the upper end thereof.

As is clearly shown in FIGS. 1 and 2, the support system slants with respect to the direction of motion of the equipment. The lower support shoes 10 each articulates about a pivot bolt 11. The line joining the pivot bolt 11 with the shaft, i.e. the pivot bolt 6, in other words, the lower lever arm 12, makes an obtuse angle backwards to the junction line, i.e. the upper lever arm 14, between the pivot bolt 6 and the pivot bolt 13 of the upper support shoe.

A thrust rod 16 acts in articulating manner at 15 on the upper lever arm 14; the rod 16 is selectively driven by a spindle, an electrical motor, a hydraulic engine or the like.

As shown in FIG. 3, the upper lever arm 14 can be adapted to the particular inside height of the sewer pipe 5 by mounting spacing means 17 on the upper end of the lever 8.

The hoof-shaped support shoes 9 and 10 are provided with surfaces 18 made of elastic materials, for instance rubber or plastics.

As shown in FIG. 2, the spacing A between the pivot bolt 6 and the surface of the lower support shoes 10 should exceed the spacing B between the pivot bolt 6 and the plane of engagement 19 of the rear wheel 3 with the interior of the pipe 5.

In operation, the equipment is set up at an arbitrary location in the pipe butt 5 already laid. Thereafter the support system 7 is pivoted to the rear in a counter-clockwise direction through the angle alpha, maintaining a slanted position while its hoof-shaped shoes 9,10 grip the inside wall of the pipe butt 5 at the top and bottom.

Simultaneously the rear wheels 3 of the pulling unit 1 are lifted. The pulling forces acting on the pulling unit 1 when the next pipe butt is pulled to the previously laid pipe cause increasing pressures by the support system 7 against the pipe butt 5 and endow the entire equipment with secure fastening. After the pull work is done, the support system is pivoted forward and detached thusly from the pipe butt 5.

What is claimed is:

1. A device for pulling together and connecting sewer pipes of a large diameter wherein one pipe is positioned and a next pipe is to be connected to the one pipe, said device comprising a pulling unit adapted to be moved within a positioned pipe and to engage the next pipe by means of a pulling line, an inclined supporting system carried by said pulling unit for reacting against upper and lower portions of a positioned pipe in which the pulling unit is positioned, said supporting system including an inclined lever, a pivot carried by said pulling unit pivotally mounting said lever, supporting shoes for engaging the interior of a pipe pivotally mounted on opposite ends of said lever, and pushing means carried by said pulling unit and connected to said lever for pivoting said lever about said pivot, lines extending between said pivot and pivots mounting said supporting shoes on said lever defining an obtuse angle, said pivot being fixedly positioned relative to both said pulling unit and said lever and positively dividing said lever into an upper lever arm and a lower lever arm with said upper lever arm being of a length which is a multiple of the length of said lower lever arm, said pushing means are pivotally connected to said upper arm, said pulling unit and said pushing means being mounted in front of said supporting system, and said pulling line being intended to be generally at the level of said lever arm pivot.

2. A device according to claim 1 wherein the lower lever arm slopes at the time the lower shoes engage the pipe to lift the rear of said pulling unit relative to the pipe.

3. A device according to claim 1 wherein said lower lever arm is bifurcated and carries two of said supporting shoes for engaging the pipe at two transversely spaced points.

4. A device according to claim 3 wherein said supporting shoes have a pipe engaging surface formed of a resilient material including rubber and synthetics.

5. A device according to claim 1 wherein said supporting shoes have a pipe engaging surface formed of a resilient material including rubber and synthetics.

* * * * *